(12) United States Patent
Kusano et al.

(10) Patent No.: US 11,389,984 B2
(45) Date of Patent: Jul. 19, 2022

(54) CUTTING DEVICE

(71) Applicant: DENSO CORPORATION, Kariya (JP)

(72) Inventors: Itaru Kusano, Kariya (JP); Kazuhisa Ishimura, Kariya (JP); Masahiko Natsume, Kariya (JP); Kenichiro Naka, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/597,082

(22) Filed: Oct. 9, 2019

(65) Prior Publication Data

US 2020/0114537 A1 Apr. 16, 2020

(30) Foreign Application Priority Data

Oct. 10, 2018 (JP) .............................. JP2018-192105

(51) Int. Cl.
| | |
|---|---|
| B26D 7/08 | (2006.01) |
| B26D 1/547 | (2006.01) |
| B06B 3/00 | (2006.01) |
| B28B 11/12 | (2006.01) |
| B01D 53/94 | (2006.01) |
| F01N 3/28 | (2006.01) |
| B01J 35/04 | (2006.01) |
| B28B 3/20 | (2006.01) |

(52) U.S. Cl.
CPC ............. *B26D 7/086* (2013.01); *B01D 53/94* (2013.01); *B01J 35/04* (2013.01); *B06B 3/00* (2013.01); *B26D 1/547* (2013.01); *B28B 11/12* (2013.01); *F01N 3/2828* (2013.01); *B01D 2255/9155* (2013.01); *B28B 3/20* (2013.01); *B28B 2003/203* (2013.01); *F01N 2330/06* (2013.01)

(58) Field of Classification Search
CPC ................................ B26D 7/086; B26D 1/547
USPC ........................................................ 83/651.1
See application file for complete search history.

(56) References Cited

U.S. PATENT DOCUMENTS

| | | | | | |
|---|---|---|---|---|---|
| 2,958,323 | A | * | 11/1960 | Knoph ............... | B23D 57/0023 125/21 |
| 3,679,526 | A | * | 7/1972 | Horton ............... | B29C 65/7443 83/202 |
| 4,311,073 | A | * | 1/1982 | Brugger .................. | B28B 11/16 83/23 |

(Continued)

FOREIGN PATENT DOCUMENTS

| | | |
|---|---|---|
| JP | S63-067105 | 3/1988 |
| JP | 2001-001330 | 1/2001 |

(Continued)

*Primary Examiner* — Kenneth E Peterson
(74) *Attorney, Agent, or Firm* — Nixon & Vanderhye P.C.

(57) ABSTRACT

A cutting device of cutting a soft honeycomb mold body in a cutting direction perpendicular to an axial direction of the honeycomb mold body. A cutting device has a wire, a tension supply part and a pair of ultrasonic generators. The wire has a contact part which is stretched and in contact with the honeycomb mold body when the honeycomb mold body is cut. The tension supply part supplies tensile to the contact part when the honeycomb mold body is cut. The pair of ultrasonic generators have respective vibrator terminals arranged in contact with the contact part of the wire. The ultrasonic generators generate ultrasonic vibration in the cutting direction and supply the generated ultrasonic vibration directly to the wire.

18 Claims, 12 Drawing Sheets

(56) References Cited

U.S. PATENT DOCUMENTS

| | | | |
|---|---|---|---|
| 4,702,138 A | 10/1987 | Hattori et al. | |
| 4,766,790 A * | 8/1988 | Harris | B23D 53/08 83/56 |
| 6,711,979 B1 | 3/2004 | Miyakawa et al. | |
| 7,930,963 B2 * | 4/2011 | Tokiwa | B23D 55/082 83/789 |
| 9,662,799 B2 * | 5/2017 | Seto | B26D 7/086 |
| 2002/0020275 A1 | 2/2002 | Fukuta et al. | |
| 2003/0034022 A1 * | 2/2003 | Egglhuber | B28D 5/045 125/21 |
| 2003/0089214 A1 | 5/2003 | Fukuta et al. | |
| 2004/0195719 A1 | 10/2004 | Ishii et al. | |
| 2007/0178205 A1 * | 8/2007 | Kirksey | B26D 7/086 426/518 |
| 2009/0255392 A1 * | 10/2009 | Lee | B26D 7/086 83/651.1 |
| 2010/0154992 A1 * | 6/2010 | Feinstein | B23K 26/57 156/711 |
| 2010/0288092 A1 * | 11/2010 | Manger | B26D 7/086 83/13 |
| 2015/0047622 A1 | 2/2015 | Toba et al. | |
| 2015/0239140 A1 * | 8/2015 | Majestic | B26D 7/086 264/433 |
| 2018/0206371 A1 * | 7/2018 | Williams | B23D 57/0069 |
| 2021/0046666 A1 * | 2/2021 | Cloots | B23D 57/0046 |

FOREIGN PATENT DOCUMENTS

| | | |
|---|---|---|
| JP | 2002-001790 | 1/2002 |
| JP | 2002-321188 | 11/2002 |
| JP | 2006-346848 | 12/2006 |
| JP | 2007-230128 | 9/2007 |
| JP | 2007-230129 | 9/2007 |
| JP | 2011-224761 | 11/2011 |

* cited by examiner

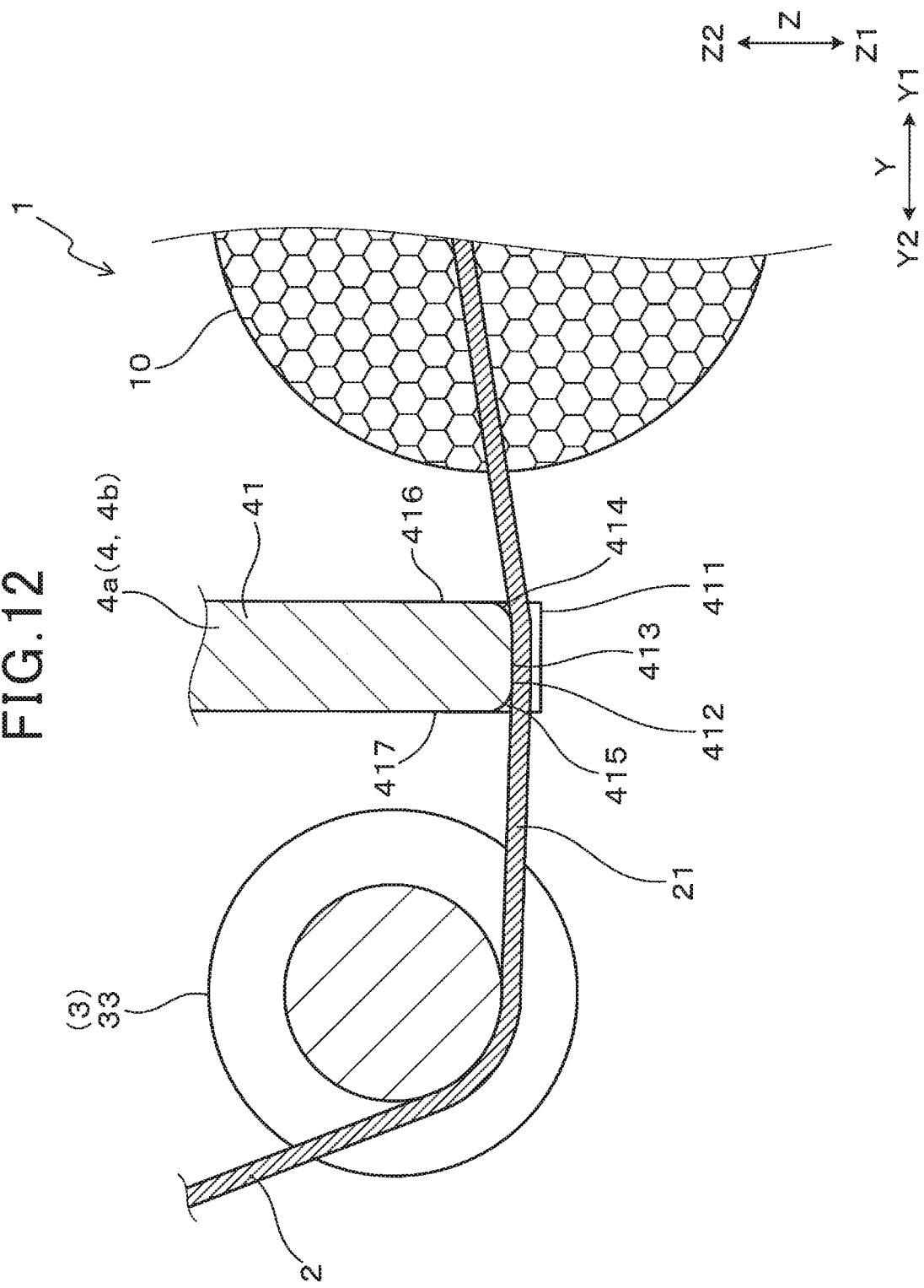

CUTTING DEVICE

CROSS-REFERENCE TO RELATED APPLICATION

This application is related to and claims priority from Japanese Patent Application No. 2018-192105 filed on Oct. 10, 2018, the contents of which are hereby incorporated by reference.

TECHNICAL FIELD

The present disclosure relates to cutting devices having wires which cut a soft honeycomb molded body

BACKGROUND

An exhaust gas purification device is mounted to motor vehicles, etc. to purify exhaust gas emitted from an internal combustion engine of a motor vehicle.

An exhaust gas purification device has a honeycomb structure body and catalyst. The honeycomb structure body is made of ceramics mounted on an exhaust gas pipe connected to the internal combustion engine mounted on a motor vehicle. Catalyst is supported in the honeycomb structure body. The honeycomb structure body has a plurality of cell walls and an outer circumferential wall. On a cross section of the honeycomb structure body, which is perpendicular to a longitudinal direction thereof, the cell walls are arranged in a lattice arrangement to form a plurality of cells. That is, each cell is surrounded by the cell walls. The cells are arranged adjacently from each other in a lattice arrangement on a cross section of the honeycomb structure body. The outer circumferential wall is formed on an outer periphery of the cell walls. Catalyst is supported on surfaces of the cell walls.

A description will be given of a known method of producing a honeycomb structure body. The method has an extrusion mold step, a cutting step and a calcination step.

The extrusion mold step extrudes and mold clay containing raw powder such as ceramics powder to extrude and mold a green body having a necessary shape such as a honeycomb structure. This extrusion mold step produces a soft honeycomb mold body.

The cutting step cuts the soft honeycomb mold body into a plurality of mold bodies having a predetermined length. The calcination step calcines the mold bodies to produce hard honeycomb structure bodies.

In the cutting step, because the soft honeycomb mold body has a soft material, the cutting step may deform each cut body. In order to avoid this drawback of the known method, there is a technique to a cutting device having a frame, a pair of idlers and a pair of bobbins. The pair of idlers hook a middle part of each wire, and the pair of bobbins winds both sides of each wire. In order to cut a soft honeycomb mold body without deformation, the technique uses an ultrasonic vibrator attached to the frame.

However, because the technique has the frame equipped with the ultrasonic vibrator, there is a possible case in which the ultrasonic vibrator does not transmit the generated vibration to a part of the wire at which the soft honeycomb mold body is cut.

SUMMARY

It is desired for the present disclosure to provide a cutting device which cuts a honeycomb mold body without suppressing deformation of cut bodies. The cutting device has a wire, a tension supply part and a pair of ultrasonic generators. The wire has a contact part. The contact part is stretched and in contact with the honeycomb mold body when the honeycomb mold body is cut. The tension supply part supplies tension to the contact part when the honeycomb mold body is cut. The pair of ultrasonic generators have respective vibrator terminals arranged in contact with the contact part of the wire. The ultrasonic generators generate ultrasonic vibration in the cutting direction, and supply the generated ultrasonic vibration to the wire.

BRIEF DESCRIPTION OF THE DRAWINGS

A preferred, non-limiting embodiment of the present disclosure will be described by way of example with reference to the accompanying drawings, in which:

FIG. 12 is a view showing a schematic cross section of one of ultrasonic generators in the cutting device, in which a honeycomb mold body is placed, according to the second exemplary embodiment.

DETAILED DESCRIPTION OF THE PREFERRED EMBODIMENTS

Figure 1:
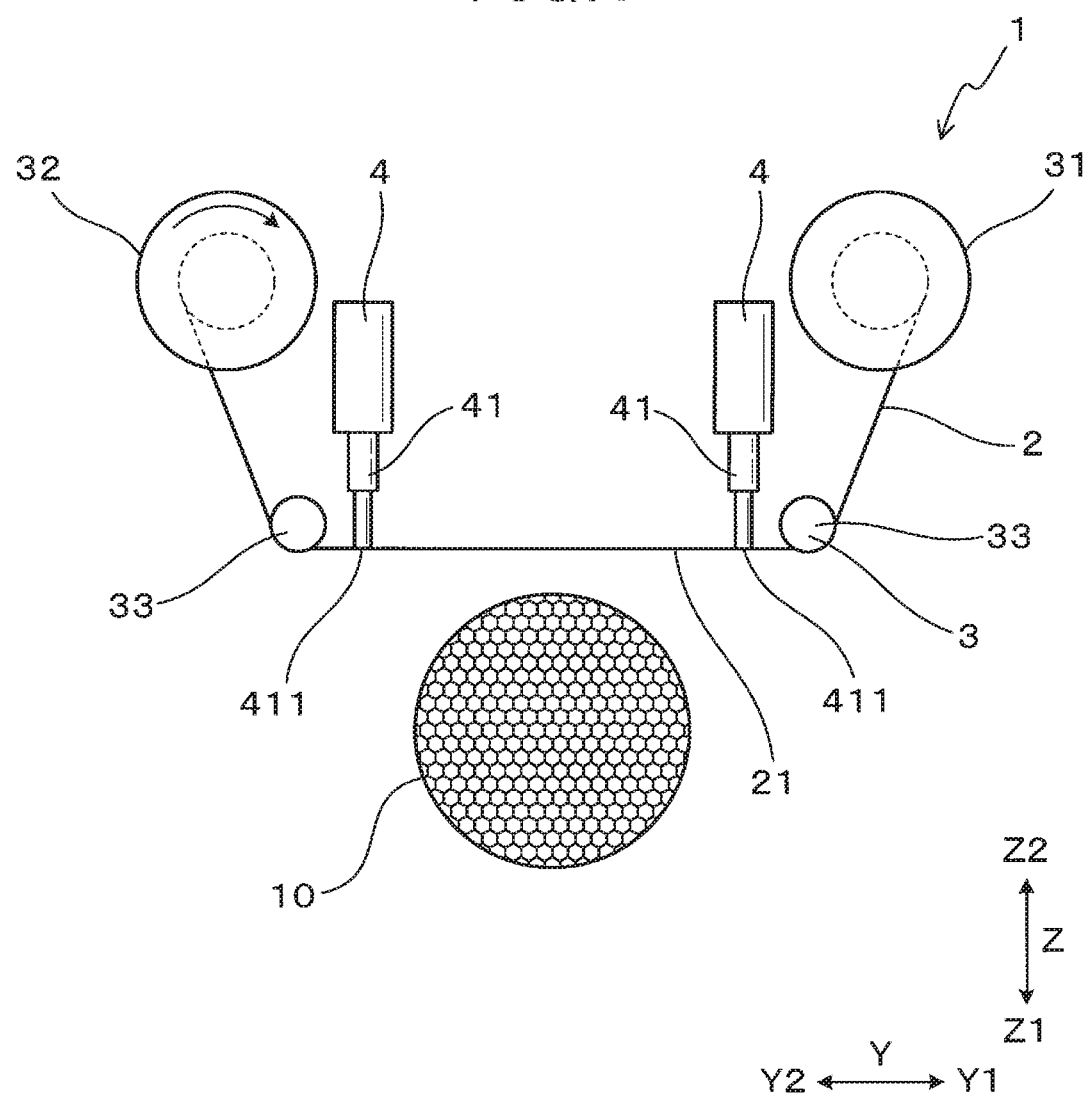
FIG. 1 is a view showing a schematic front image of a cutting device, in which a honeycomb mold body is placed, according to a first exemplary embodiment of the present disclosure.

Hereinafter, various embodiments of the present disclosure will be described with reference to the accompanying drawings. In the following description of the various embodiments, like reference characters or numerals designate like or equivalent component parts throughout the several diagrams.

First Exemplary Embodiment

A description will be given of a cutting device according to a first exemplary embodiment with reference to FIG. 1 to FIG. 5.

Figure 2:
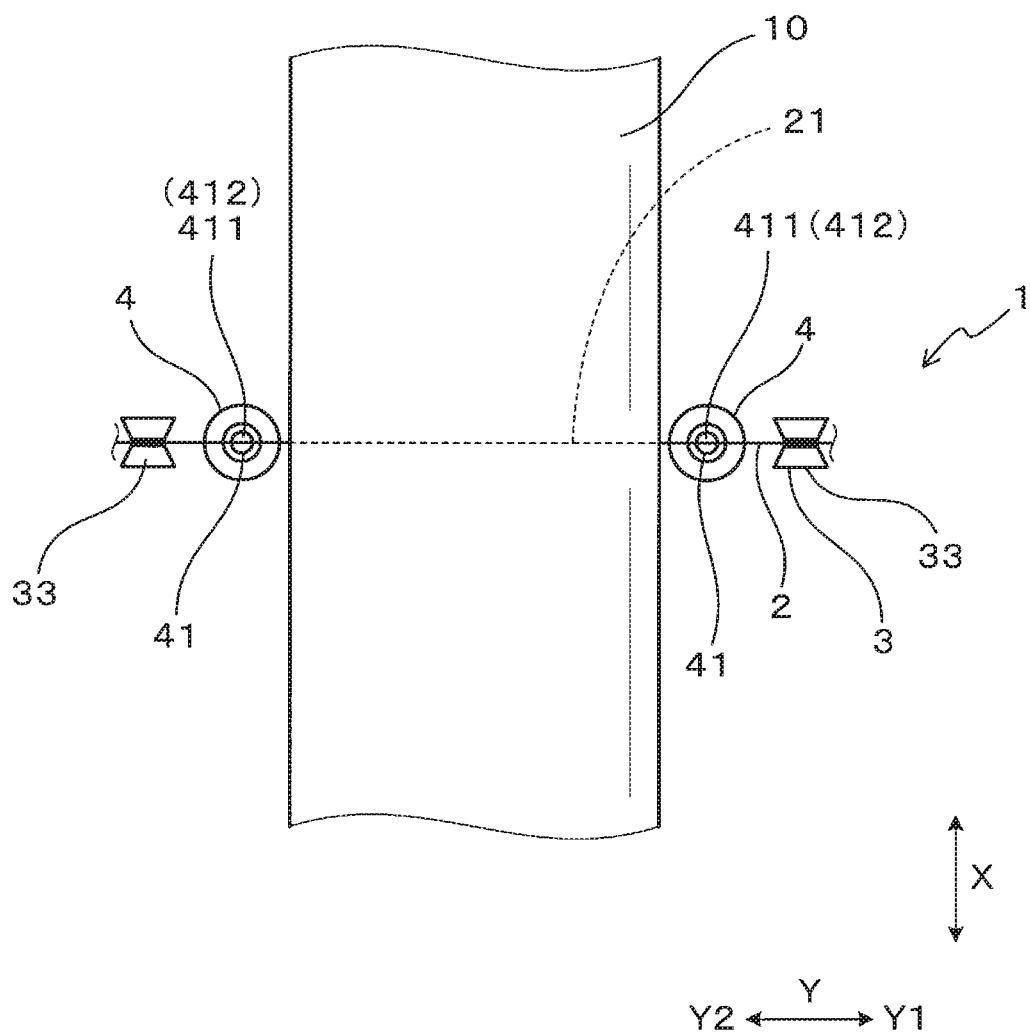
FIG. 2 is a view showing a schematic bottom image of the cutting device, in which a honeycomb mold body is placed, viewed from Z1 side shown in FIG. 1.

FIG. 1 is a view showing a schematic front image of the cutting device 1, in which a honeycomb mold body 10 is placed, according to the first exemplary embodiment of the present disclosure. FIG. 2 is a view showing a schematic bottom image of the cutting device 1, in which the honeycomb mold body 10 is placed, viewed from Z1 side shown in FIG. 1.

As shown in FIG. 1 and FIG. 2, the cutting device 1 cuts the soft honeycomb mold body 10 in a cutting direction Z by using a wire 2. The cutting direction Z is perpendicular to the axial direction X of the honeycomb mold body 10. A direction Y is perpendicular to the axial direction A and the cutting direction Z.

As shown in FIG. 1 and FIG. 2, the cutting device 1 has the wire 2, a tension supply part 3 and ultrasonic generators 4. The wire 2 has a contact part 21. The tension supply part 3 has a pair of guide parts 33. The contact part 21 is arranged to be stretched between the pair of guide parts 33 in the cutting device 1. For example, as shown in FIG. 2, the cutting device 1 cuts the soft honeycomb mold body 10 while the contact part 21 is in contact with the honeycomb mold body 10.

The tension supply part 3 supplies tension to the contact part 21 when the cutting device 1 cuts the honeycomb mold body 10. The ultrasonic generators 4 have a pair of vibrator terminals 41 which generate ultrasonic vibration in the cutting direction Z. In the ultrasonic generators 4, the vibrator terminals 41 are directly in contact with the contact part 21 of the wire 2 so as to provide vibration to the wire 2.

A description will be given of the honeycomb mold body 10 to be cut by the cutting device 1 according to the first exemplary embodiment with reference to FIG. 5.

Figure 5:
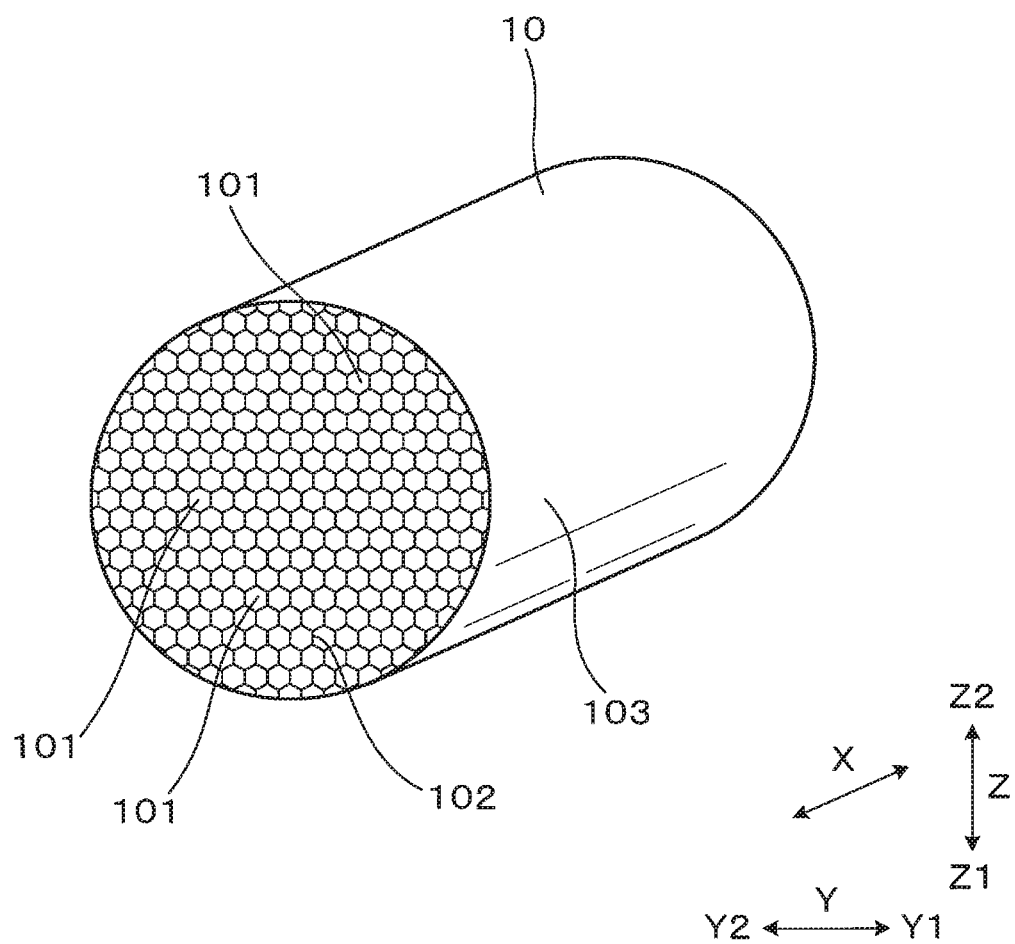
FIG. 5 is a perspective view showing a cut piece of the honeycomb structure body which has been cut by the cutting device according to the first exemplary embodiment of the present disclosure.

FIG. 5 is a perspective view showing a cut piece of the honeycomb mold body 10 which has been cut by the cutting device according to the first exemplary embodiment of the present disclosure. FIG. 5 shows one example of the cut piece in the honeycomb mold body 10 which has been cut by the cutting device 1. It is possible for the cutting device 1 to cut various types of honeycomb mold bodies made of various materials.

The honeycomb mold body 10 is formed to have a cylindrical shape which extends toward the axial direction X. In general, the honeycomb mold body 10 has a plurality of cell walls 102 and an outer circumferential wall 103. On a cross section of the honeycomb mold body 10, which is perpendicular to the axial direction X thereof, the cell walls 102 are arranged in a lattice arrangement to form a plurality of cells 101. That is, each cell 101 is surrounded by the cell walls 102. The cells 101 are arranged adjacently from each other in a lattice arrangement on a cross section of the honeycomb mold body 10. The outer circumferential wall 103 is formed on an outer periphery of the cell walls 102. Catalyst is supported on surfaces of the cell walls 102.

Each cell 101 is a through hole which penetrates the honeycomb mold body in the axial direction X. Each cell 101 has a hexagonal cross section, which is perpendicular to the axial direction X. The six cell walls 102 form each cell 101. The outer circumferential wall 103 has a cylindrical shape along the axial direction X. The outer circumferential surface pf the cell walls 102 are in contact with the inner circumferential surface of the outer circumferential wall 103.

A description will now be given of a method of producing the soft honeycomb mold body 10 to be cut by the cutting device 1 according to the first exemplary embodiment.

The production of the honeycomb mold body 10 uses cordierite raw material which contains source of silicon (Si), aluminum (Al) and magnesium (Mg).

Calcination of the cordierite raw material generates a cordierite having a specific cordierite composition. It is possible to use, as a cordierite raw material, a mixture of a specific composition which contains kaolin, silica, aluminum hydroxide, alumina, talc, etc. That is, those raw materials are mixed together having a following composition:

$SiO_2$ within a range of 45 to 55 weight %, $Al_2O_3$ within a range of 33 to 42 weight % and Mg within a range of 12 to 18 weight %.

In the production of the honeycomb mold body 10, a specific amount of each of water, binder, lubricant, pore forming material, etc. are added to a cordierite raw material. These are mixed to form a clay. The produced clay is extruded to mold a honeycomb mold body 10 having a soft mold along a longitudinal direction in the axial direction X.

The cutting device 1 according to the first exemplary embodiment cuts the honeycomb mold body 10 to a plurality of pieces having a predetermined length.

However, the concept of the present disclosure is not limited by the production method previously described. For example, it is possible to use another method of performing an extrusion mold step which produces a plurality of cell walls 102 forming one or more cells 101, and of stacking the produced cell walls 102 together to form the honeycomb mold body 10.

The cutting device 1 performs a cutting step in which the honeycomb mold body 10 is cut in the cutting direction Z into a plurality of pieces having a predetermined length in the axial direction X.

In the cutting step, the contact part 21 of the wire 2 in the cutting device 1 penetrates the honeycomb mold body 10 to one side Z1 as one end of the cutting direction Z. This cuts the honeycomb mold body 10 into one piece. The other side Z2 which is opposite to the one side Z1.

After the cutting step, a calcining step calcines the soft honeycomb mold body 10 which has been cut in the cutting step to harden it. The calcining step produces a hard honeycomb structure body.

For example, the honeycomb structure body is used in an exhaust gas purification device mounted on a motor vehicle. The exhaust gas purification device purifies exhaust gas emitted from an internal combustion engine mounted on the motor vehicle.

A description will now be given of the cutting device 1 according to the first exemplary embodiment in detail.

As shown in FIG. 1 and FIG. 2, the cutting device 1 has the wire 2, the tension supply part 3 and the ultrasonic generators 4. The wire 2 is made of a piano wire, for example. The wire 2 has 0.08 mm or 0.2 mm diameter. In order to improve cutting capability of the honeycomb mold body 10, it is preferable for the wire 2 to have a diameter of less than 0.15 mm.

As shown in FIG. 1, the tension supply part 3 has a fixing part 31, a winding part 32 and a pair of guide parts 33. The fixing part 31 fixes one end of the wire 2. The winding part 32 winds the other end of the wire 2 to supply tensile to the wire 2. The wire 2 is arranged at an outer circumferential part of each of the pair of guide parts 33. The pair of guide parts 33 are arranged movably in the cutting direction Z from the fixing part 31 and the winding part 32.

The tension supply part 3 moves the pair of guide parts 33 toward Z1 side from the location of the fixing part 31 and the location of the winding part 32. This allows the contact part 21 of the wire 2 to move toward the direction Y1 as one side in the direction Y.

A first bobbin forms the fixing part 31, and a second bobbin forms the winding part 32. The first bobbin and the second bobbin are attached to a first frame (not shown).

The fixing part 31 is fixed to the first frame (not shown). The first frame prohibits the fixing part 31 from rotating. One end of the wire 2 is wound by and fixed to the fixing part 31.

The winding part 32 is composed of the bobbin attached to the first frame. The bobbin prohibits the winding part 32 from rotating.

The winding part 32 is attached to rotate around an axial extending toward the axial direction X. The winding part 32 is pressed to the winding side (in the direction designated by the arrow shown in FIG. 1) on the circumferential direction by a main spring, for example. This allows the winding part 32 to always tense the wire 2.

The pair of guide parts 33 is attached to a second frame which is movable in the cutting direction Z from the first frame.

As shown in FIG. 1 and FIG. 2, the pair of guide parts 33, i.e. a right-hand side guide part and a left-hand side guide part are arranged at a predetermined interval in the direction Y. Each of the right-hand side guide part and the left-hand side guide part is composed of a roller which is rotating in the circumferential direction of the second frame. Each of the right-hand side guide part 33 and the left-hand side guide part 33 is attached to the second frame rotatable around the axial extending in the axial direction X. Each of the right-hand side guide part 33 and the left-hand side guide part 33 has a rounded shape, a diameter of which is reduced toward its central part in the axial direction X. The wire 2 is arranged at the central part of each of the right-hand side guide part 33 and the left-hand side guide part 33. It is acceptable for both the guide parts 33 to be mounted to the second frame so as to be not rotatable in the circumferential direction so long as the wire 2 can slide through both the guide parts 33.

As shown in FIG. 1, the contact part 21 of the wire 2 arranged between the fixing part 31 and the winding part 32 is hooked by the guide parts 33 in Z1 side.

The wire 2 is bridged between the pair of right-hand side guide part 33 and left-hand side guide part 33 due to a tension created by a winding force of the winding part 32.

Similar to the pair of guide parts 33, the ultrasonic generators 4 are fixed to the second frame. Accordingly, the ultrasonic generators 4 are arranged to be movable in the cutting direction Z from the first frame.

As shown in FIG. 1 and FIG. 2, the cutting device 1 according to the first exemplary embodiment has the pair of ultrasonic generators 4. The pair of ultrasonic generators 4 are arranged at both end sides of the honeycomb mold body 10 in the direction Y. Each of the ultrasonic generators 4 has the vibrator terminal 41 at the front end side of the ultrasonic generator 4 (i.e. at the end part in Z1 side).

The vibrator terminal 41 of the ultrasonic generator 4 is configured to generate ultrasonic wave of not less than 20 kHz vibrated in the cutting direction Z.

As shown in FIG. 1 and FIG. 2, the vibrator terminals 41 of the ultrasonic generators 4 are arranged to be in contact with both sides of the contact part 21 of the wire 2 in the direction Y of the honeycomb mold body 10. Each of the vibrator terminals 41 has a column shape. A front end surface 411 of each of the vibrator terminals 41 has a contact surface 412. The contact surface 412 is arranged to be in contact with the contact part 21 of the wire 2. The contact surface 412 of the vibrator terminal 41 of each of the ultrasonic generators 4 is in contact with the contact part 21 of the wire 2 while by the contact part 21 of the wire 2 is cutting the honeycomb mold body 10.

The contact surface 412 of the front end surface 411 of each of the vibrator terminals 41 is arranged at the same location of the contact part 21 of the wire 2 or at a location which is slightly shifted to the direction Z2 side. That is, the contact surface 412 of the front end surface 411 of each of the vibrator terminals 41 is arranged at the location to be slightly in contact with the contact part 21 of the wire 2.

When the contact surface 412 of the front end surface 411 is arranged at a location which is slightly shifted toward the direction Z2 side when compared with the location of the contact part 21 of the wire 2 (i.e. when the contact surface 412 of the front end surface 411 is not in contact with the contact part 21 of the wire 2), the contact surface 412 of the front end surface 411 becomes in contact with the contact part 21 of the wire 2 when the cutting device 1 is cutting the honeycomb mold body 10. That is, when the contact part 21 of the wire 2 becomes in contact with the honeycomb mold body 10 so as to cut the honeycomb mold body 10, the contact part 21 of the wire 2 is warped toward the direction Z2 side, the contact part 21 of the wire 2 is in contact with the contact surface 412 of the front end surface 411.

In this cutting step, the ultrasonic generators 4 instruct the vibrator terminals 41 to generate ultrasonic vibration. The generated ultrasonic vibration is transmitted from the vibrator terminals 41 to the contact part 21 of the wire 2, and the contact part 21 of the wire 2 vibrates.

A description will now be given of the behavior of the cutting device 1 when the cutting device 1 is cutting the honeycomb mold body 10 with reference to FIG. 3 and FIG. 4.

Figure 3:
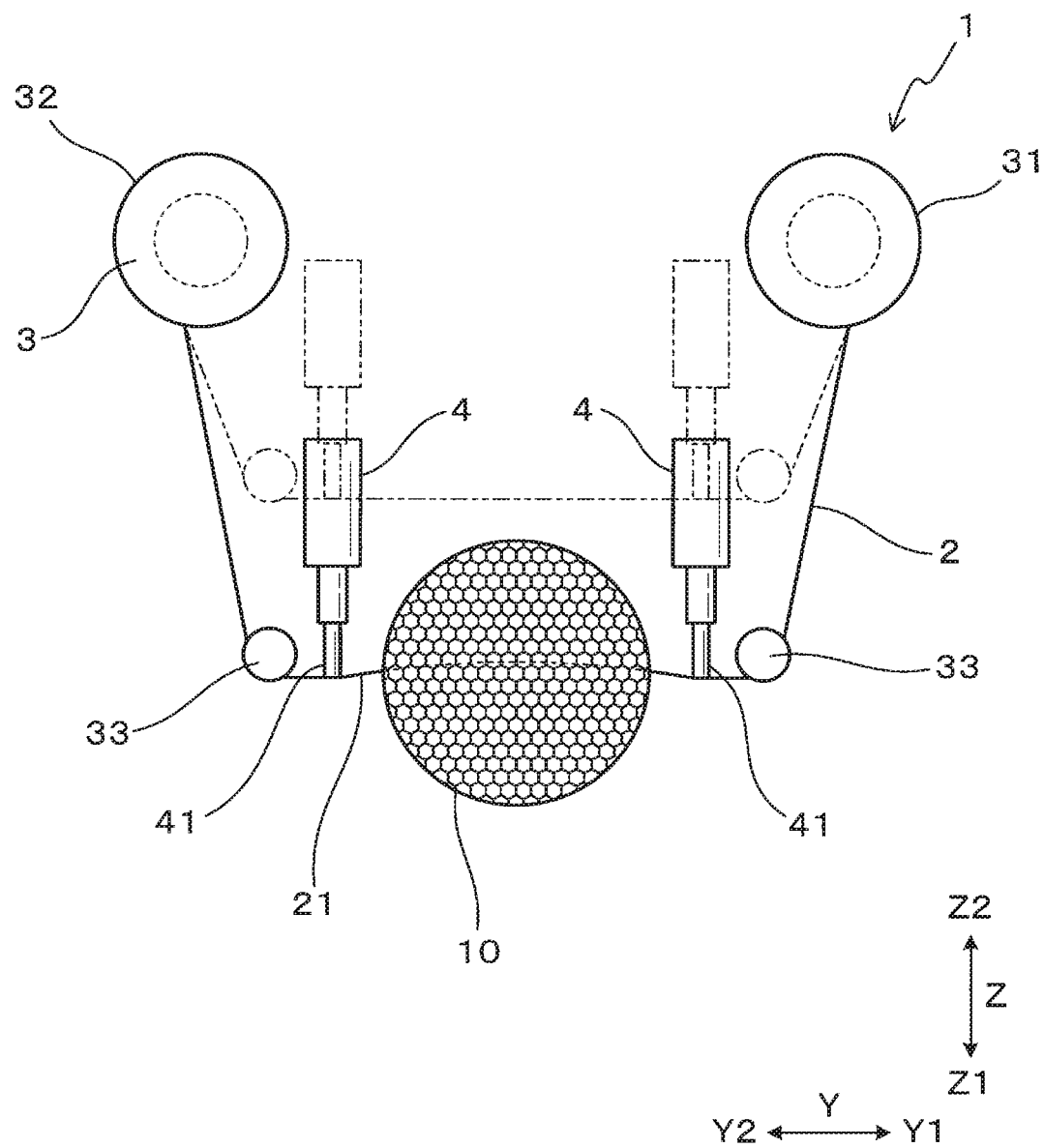
FIG. 3 is a view showing a schematic front image of the cutting device performing a cutting step of cutting the honeycomb mold body.
Figure 4:
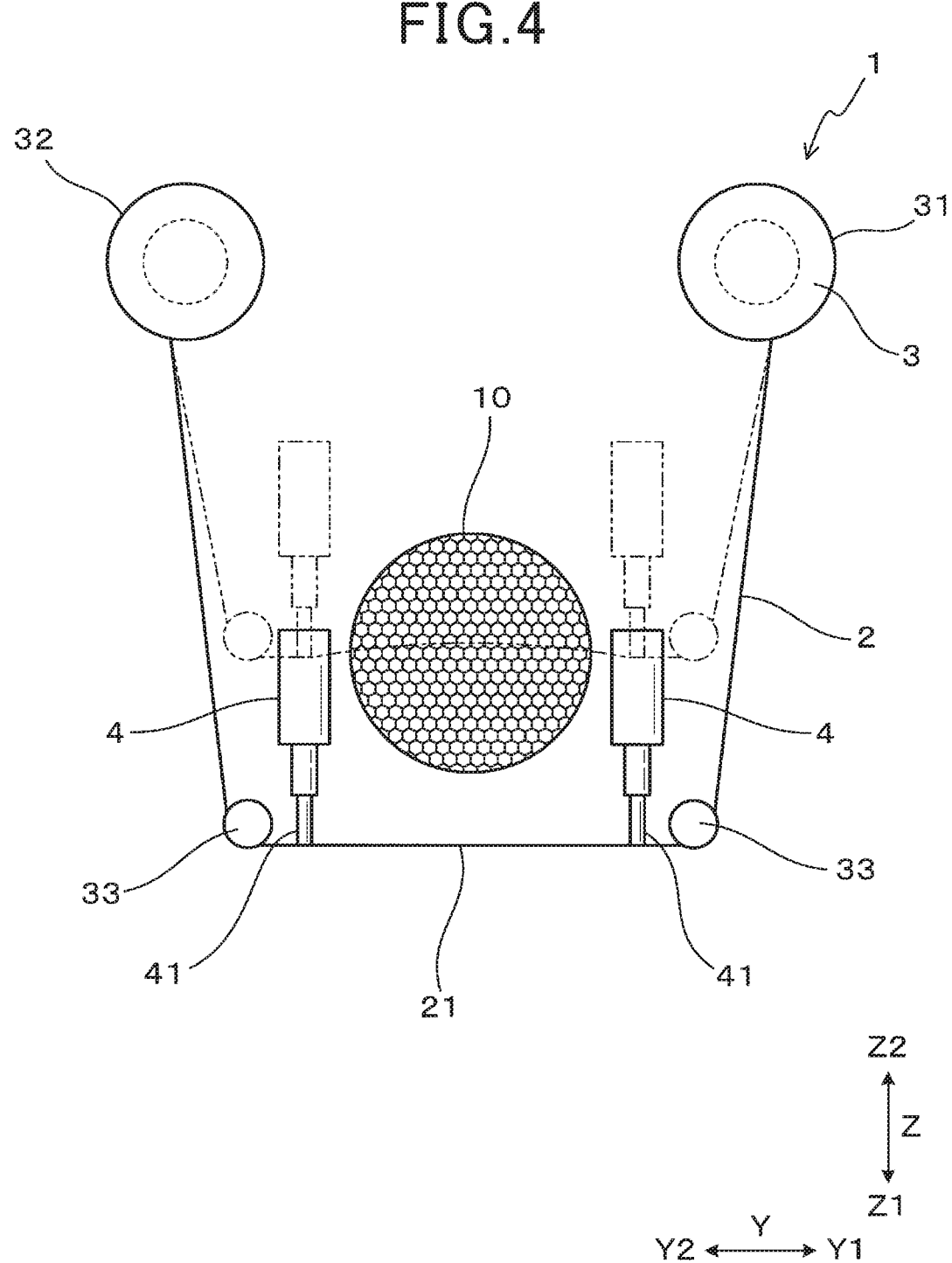
FIG. 4 is a view showing a schematic front image of the cutting device, in which a honeycomb mold body has been cut, after the cutting step has been finished.

FIG. 3 is a view showing a schematic front image of the cutting device 1 performing the cutting step of cutting the honeycomb mold body 10. FIG. 4 is a view showing a schematic front image of the cutting device 1, in which the honeycomb mold body 10 has been cut, after the cutting step has been finished.

In the cutting step, the honeycomb mold body 10 is arranged at Z1 side of the contact part 21 of the wire 2.

The ultrasonic generators 4 instruct the respective vibrator terminals 41 to be vibrated, and the second frame is moved toward the first frame in Z1 side.

Next, while the vibrator terminals 41 of the ultrasonic generators 4 generate ultrasonic vibration, the second frame is shifted toward Z1 side from the first frame. As shown in FIG. 3 and FIG. 4, this movement of the second frame allows the contact part 21 of the wire 2 and the pair of ultrasonic generators 4 to be moved toward Z1 side. After this, the contact part 21 of the wire 2 is pressed to the inside of the honeycomb mold body 10. The honeycomb mold body 10 is cut when the contact part 21 of the wire 2 passes through the honeycomb mold body 10.

That is, when the second frame is moved toward Z1 side from the second frame, the pair of guide parts 33 stretch the part of the wire 2 between the fixing part 31 and the winding part 32 of the tension supply part 3 toward Z1 side. This allows the contact part 21 of the wire 2 is moved toward the Y1 side in the direction Y while the wire 2 is pulled from the winding part 32.

As previously described, the pair of guide parts 22 are moved toward Z1 side from the location of the fixing part 31 and the winding part 32, the contact part 21 of the wire 2 is mechanically moved toward the Y1 side in the direction Y.

In the cutting step of cutting the honeycomb mold body 10, the movement of the contact part 21 of the wire 2 cuts the honeycomb mold body 10 in the direction Y, and further the movement of the contact part 21 of the wire 2 cuts the honeycomb mold body 10 in the cutting direction Z.

A description will be given of behavior and its effects of the cutting device 1 according to the first exemplary embodiment.

In the structure of the cutting device 1 according to the first exemplary embodiment, the vibrator terminals 41 of the ultrasonic generators 4 are arranged to be in contact with the contact part 21 of the wire 2, generate ultrasonic vibration and supply the generated ultrasonic vibration directly to the wire 2. This makes it possible to easily vibrate the wire 2, and to improve the performance of the cutting device 1 to cut the honeycomb mold body 10 without deformation. That is, the cutting device 1 according to the first exemplary embodiment has the structure to cut the honeycomb mold body 10 into a plurality of pieces while suppressing deformation of the cut pieces.

The tension supply part 3 has the fixing part 31, the winding part 32 and the pair of guide parts 33. The tension supply part 3 moves the pair of guide parts 33 toward one side in the cutting direction Z from the location of the fixing part 31 and the location of the winding part 32. This allows the contact part 21 of the wire 2 to move toward one side in the direction Y. It is thereby possible for the contact part 21 of the wire 2 to cut the honeycomb mold body 10 in the direction Y and in the cutting direction Z. This makes it possible to increase the cutting capability of the cutting device 1. In the improved structure of the cutting device 1 according to the first exemplary embodiment, it is possible to mechanically move the contact part 21 of the wire 2.

The cutting device 1 according to the first exemplary embodiment has the pair of ultrasonic generators 4 arranged at the locations which correspond to the both sides of the honeycomb mold body 10. This structure makes it possible to easily transmit ultrasonic vibration generated by the vibrator terminals 41 of the pair of ultrasonic generators 4 to the contact part 21 of the wire 2. This improves the cutting performance of the cutting device 1 according to the first exemplary embodiment.

As previously described in detail, the first exemplary embodiment provides the cutting device 1 having a function of suppressing deformation of a honeycomb mold body from being deformed during the cutting step.

A description will now be given of first and second experiments and a second exemplary embodiment. The same components of the cutting devices between the first and second exemplary embodiments and the first and second experiments will be referred to with the same reference numbers and characters.

First Experiment

A description will now be given of a first experiment with reference to FIG. 6, FIG. 7, FIG. 8 and Table 1.

The first experiment prepared a plurality of samples, and detected the cutting performance of the cutting device 1 according to the first exemplary embodiment. The samples had the same basic structure as the honeycomb mold body 10 previously explained in the first exemplary embodiment.

The first experiment varied the position of the pair of ultrasonic generators 4 and detected the cutting performance of the cutting device 1.

The first experiment used the first sample 1 to the sixth sample 6 as the honeycomb structure body 10.

Figure 6:
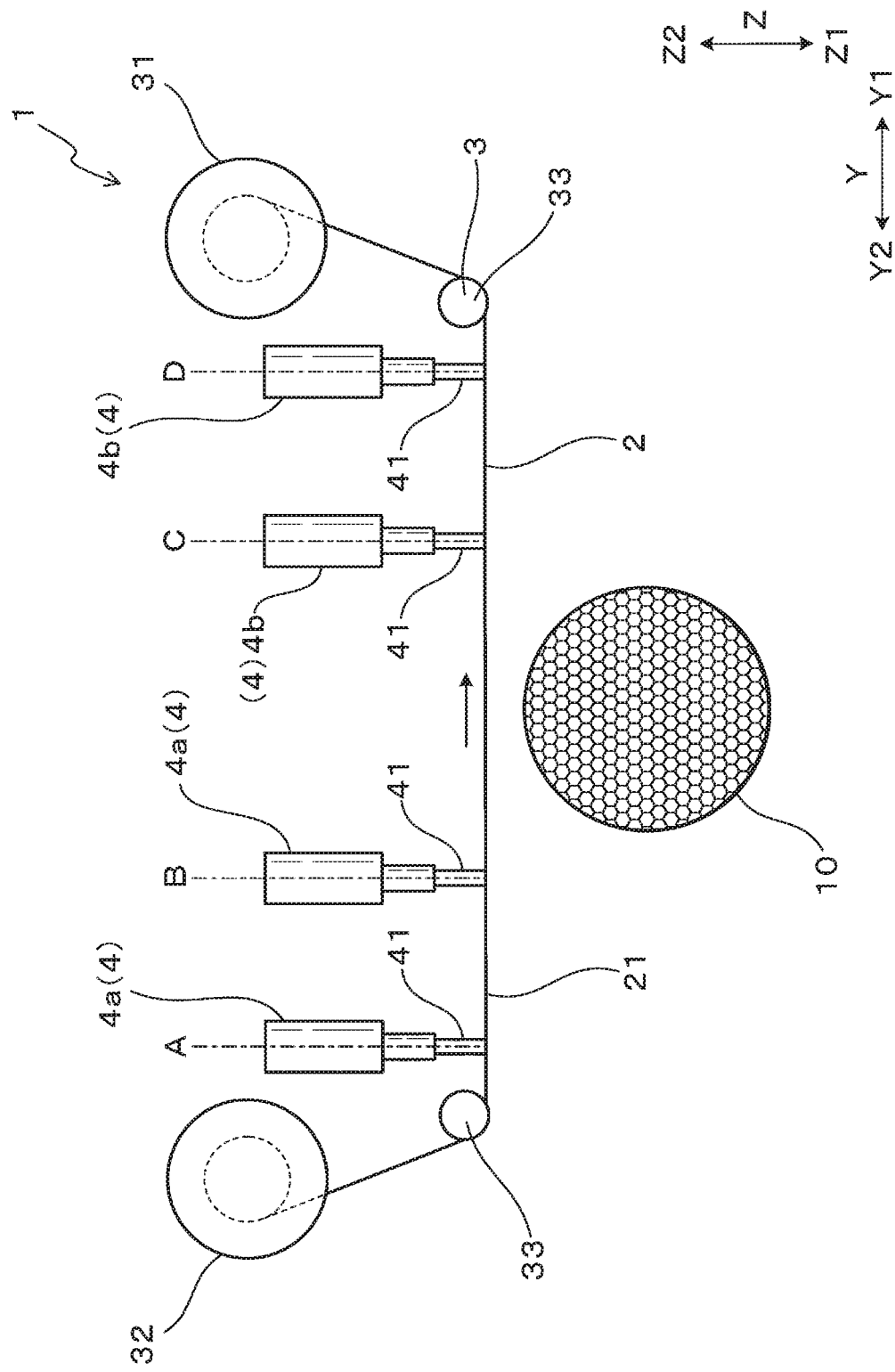
FIG. 6 is a view showing a front image of the cutting device, in which a sample as a honeycomb mold body was placed in a first experiment.

FIG. 6 is a view showing a front image of the cutting device 1, in which a sample as the honeycomb mold body 10 was placed in the first experiment.

In the first experiment, each of the first samples 1 to the sixth sample 6 was placed in the cutting device 10, and the vibrator terminals 41 of the ultrasonic generators 4 were arranged at two positions selected from four positions A to D.

The first experiment used a comparative sample as the honeycomb structure body 10 which has been cut by a cutting device without any ultrasonic generators 4.

The position B was separated by 13 mm measured from the Y2 side end part of the honeycomb mold body 10 in the direction Y.

The position A was separated by 70 mm measured from the position B toward the Y2 side in the direction Y.

The position C was separated by 13 mm measured from the position C toward the Y1 side in the direction Y.

The position D was separated by 70 mm measured from the position C toward the Y1 side in the direction Y.

The interval in the direction Y between the position B and the position C was 40 mm.

Table 1 shows a relationship between the locations A to D of the ultrasonic generators 4, deformation amount $\Delta r$ (mm) and the samples 1 to 6 and the comparative sample.

The other components of the cutting device used in the first experiment are the same as those of the cutting device 1 according to the first exemplary embodiment previously described. Similar to the honeycomb mold body 10 used in the first exemplary embodiment, each of the samples 1 to 6 and the comparative sample was moved toward the direction designated by the arrow shown in FIG. 6 during the cutting step when each of the samples and the comparative sample was cut by the contact part 21 of the wire 2 in the cutting device 1.

Each of the samples and the comparative sample has the same structure of the honeycomb mold body 10. The honeycomb mold body 10 has 114 mm diameter, 65 µm thickness, and 900 cells/inch$^2$ cell density.

The first experiments used the cutting device in which the wire 2 was 0.1 mm diameter. Each of the ultrasonic generators 4 generated its output of 600 W, 20 kHz vibration frequency, and 60 µm amplitude.

The evaluation of the cutting performance of the cutting device was performed on the basis of a deformation amount $\Delta r$ of each of the samples and the comparative sample after the cutting device had cut each of the samples and the comparative sample.

Figure 7:
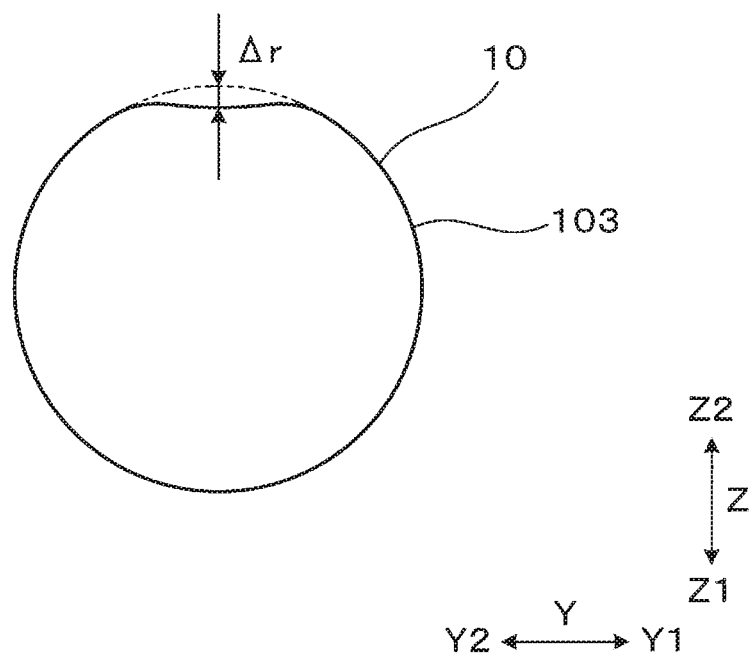
FIG. 7 is a view showing a schematic cross section of the honeycomb mold body having a deformation amount $\Delta r$ detected by the first experiment.

FIG. 7 is a view showing a schematic cross section of the honeycomb mold body having its deformation amount $\Delta r$ detected by the first experiment.

As shown in FIG. 7, the deformation amount $\Delta r$ is obtained by subtracting a minimum radius of the honeycomb mold body 10 as each of the samples and the comparative sample from the radius of the honeycomb mold body 10. FIG. 7 shows the outer circumferential wall 103 and the deformation amount $\Delta r$ only for brevity.

The more the deformation amount $\Delta r$ is small, the higher the cutting performance of the cutting device is. The more the deformation amount $\Delta r$ is greater, the more deformation of each cell wall 102 and each cell 101 are deformed detected by visual inspection.

A deformation was occurred at a portion around an inlet portion (i.e. around an end part at Z2 side), into which the wire 2 was inserted during the cutting step. Table 1 shows the relationship between the locations A to D of the ultrasonic generators 4, the deformation amount Δr (mm) and the samples 1 to 6 and the comparative sample.

TABLE 1

|  | Location of ultrasonic generators |  | Deformation amount Δr (mm) |
| --- | --- | --- | --- |
| Comparative sample | — | — | 10.5 |
| Sample 1 | A | B | 4.25 |
| Sample 2 | A | C | 3 |
| Sample 3 | A | D | 3 |
| Sample 4 | B | C | 2 |
| Sample 5 | B | D | 1.5 |
| Sample 6 | C | D | 2.5 |

As can be understood from the detection results shown in Table 1, the cutting device using the ultrasonic generators 4 located at the locations A to D which cut each of the samples and the comparative sample has a deformation amount Δr which is smaller than that of the comparative sample cut by the cutting device without an ultrasonic generator. Accordingly, the vibration of the wire 2 caused by the ultrasonic generators 4 makes it possible to improve the cutting performance of the honeycomb mold body 10.

The samples 2 to 5 were cut by the cutting device in which the ultrasonic generators 4 were arranged at both end sides of the honeycomb mold body 10 in the direction Y. The detection results shown in Table 1 clearly show that the samples 4 and 5 when the ultrasonic generator 4 at the Y2 side was arranged at the location B had a small amount deformation amount Δr than the deformation amount Δr of the other samples.

That is, it is preferable to arrange the vibrator terminal 41 of the ultrasonic generator 4 located at the Y2 side to be close to the honeycomb mold body 10 when the ultrasonic generators 4 are arranged at both sides of the honeycomb mold body 10 in the direction Y.

In the cutting device 1 in which the ultrasonic generators 4 are arranged at both sides of the honeycomb mold body 10 as the samples 1 to 6, one ultrasonic generator 4 arranged at the location (i.e. at the Y2 side) opposite to the moving direction of the contact part 21 of the wire 2 will be referred to as an upstream side ultrasonic generator 4a. On the other hand, the other ultrasonic generator 4 arranged at the location (i.e. at the Y1 side) toward the moving direction of the contact part 21 of the wire 2 will be referred to as a downstream side ultrasonic generator 4b.

As can be understood from the detection results shown in Table 1, the sample 5 has the minimum deformation amount Δr than that of the sample 4.

Figure 8:
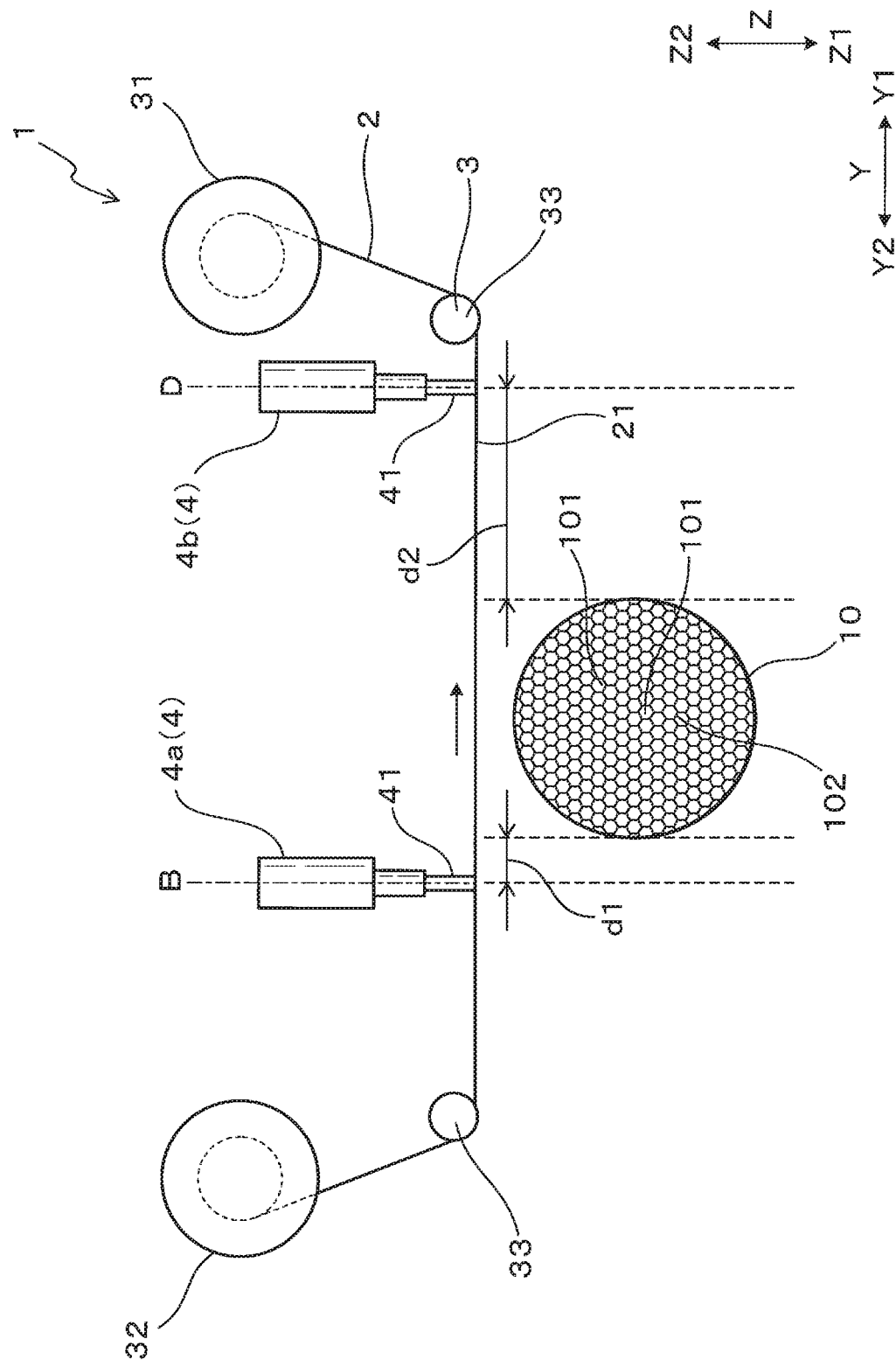
FIG. 8 is a view showing a schematic front image of the cutting device with the honeycomb mold body as each sample in which ultrasonic generators were arranged at a location B and a location D in the first experiment.

FIG. 8 is a view showing a schematic front image of the cutting device with the honeycomb mold body as each of the samples and the comparative sample in which ultrasonic generators 4 were arranged at the location B and the location D in the first experiment.

As shown in FIG. 8 and the detection results of the first experiment, it is preferable to have an arrangement in which a second interval d2 is greater than a first interval d1 in order to reduce a deformation amount Δr of the honeycomb mold body 10 in an arrangement in which the ultrasonic generators 4 are arranged at both sides of the sample as the honeycomb mold body 10 in the direction Y. The first interval d1 represents a distance between the left-hand side in the direction Y of the honeycomb mold body 10 and the vibrator terminal 41 of the upstream side ultrasonic generator 4a. The second interval d2 represents a distance between the right-hand side in the direction Y of the honeycomb mold body 10 and the vibrator terminal 41 of the downstream side ultrasonic generator 4b.

Second Experiment

A description will be given of the second experiment with reference to FIG. 9.

Figure 9:
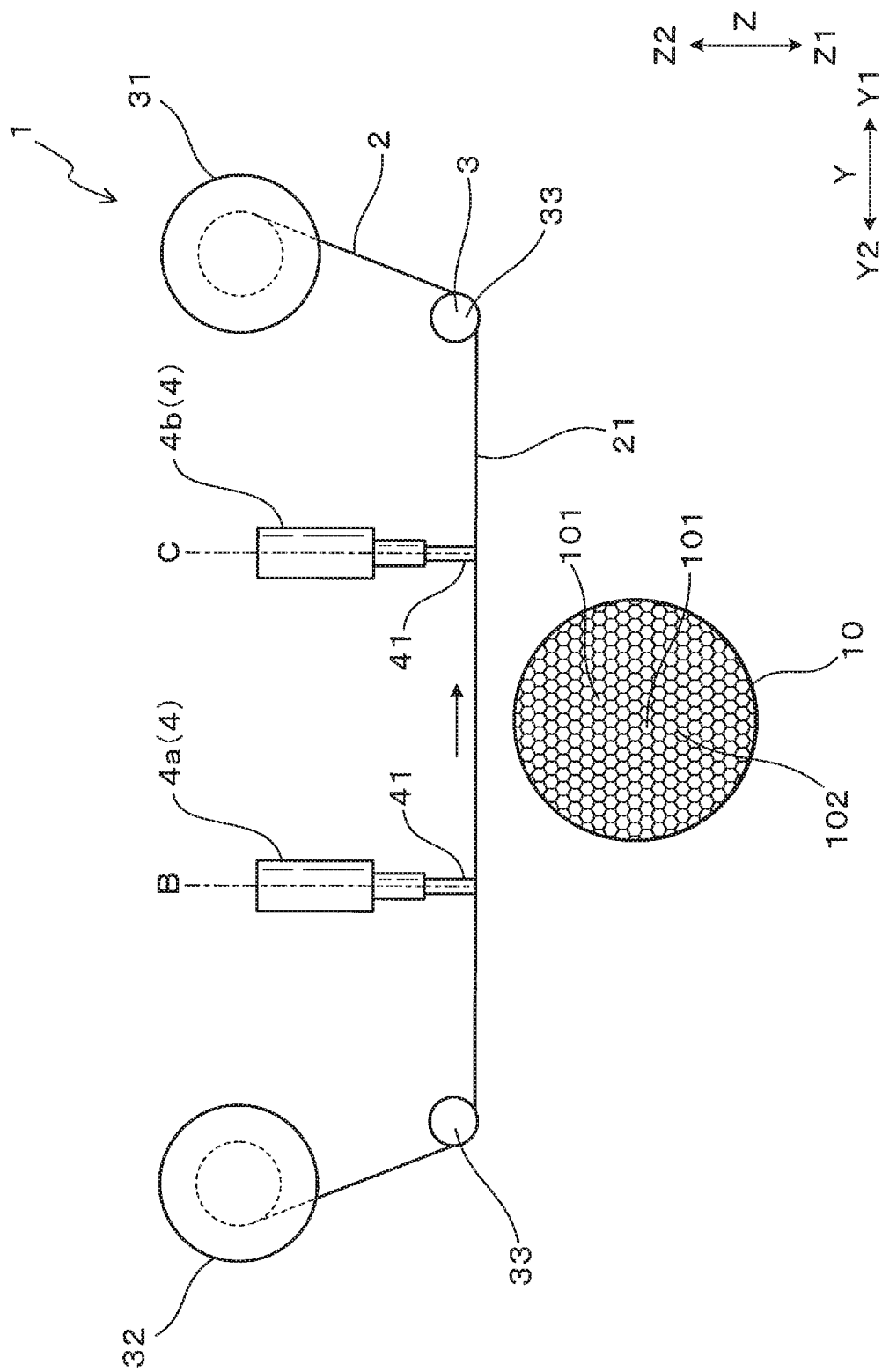
FIG. 9 is a view showing a front image of the cutting device used by a second experiment.

FIG. 9 is a view showing a front image of the cutting device used by the second experiment. In the cutting device used by the second experiment shown in FIG. 9, the vibrator terminal 41 of the upstream side ultrasonic generator 4a and the vibrator terminal 41 of the downstream side ultrasonic generator 4b generated ultrasonic vibration having a different amplitude. The second experiment varied an amplitude of the ultrasonic vibration generated in each of the upstream side ultrasonic generator 4a and the downstream side ultrasonic generator 4b. The second experiment detected the cutting performance of the cutting device when the amplitude of the ultrasonic vibration generated in each of the upstream side ultrasonic generator 4a and the downstream side ultrasonic generator 4b were varied.

In the cutting device used by the second experiment shown in FIG. 9, the vibrator terminals 41 of the upstream side ultrasonic generator 4a was arranged at the location B, and the vibrator terminals 41 of the downstream side ultrasonic generator 4b was arranged at the location C.

The second experiment used samples 7 to 15, and detected the cutting performance of cutting the samples 7 to 15 while varying an amplitude of ultrasonic vibration by the upstream side ultrasonic generator 4a and the downstream side ultrasonic generator 4b.

Table 2 shows a relationship between the samples 7 to 15, an amplitude of ultrasonic vibration generated by the upstream side ultrasonic generator 4a and the downstream side ultrasonic generator 4b, and a deformation amount Δr of each of the samples 7 to 15.

Each of the samples 7 to 15 had the same structure of the honeycomb mold body 10. The cell wall 102 had 75 μm thickness, and the cells 101 had 750 cells/inch$^2$ cell density. The honeycomb mold body 10 had 114 mm diameter which is the same as the honeycomb mold body 10 used in the first experiment previously described.

The second experiment used the cutting device in which the wire 2 was 0.08 mm diameter. Similar to the first experiment, each of the ultrasonic generators 4 generated its output at 600 W, 20 kHz vibration frequency, and 60 μm amplitude. Table 2 shows the detection results of the second experiment.

TABLE 2

|  | Amplitude (μm) of ultrasonic vibration generated by upstream side ultrasonic generator 4a | Amplitude (μm) of ultrasonic vibration generated by downstream side ultrasonic generator 4b | Deformation amount Δr (mm) |
| --- | --- | --- | --- |
| Sample 7 | 60 | 60 | 0.2 |
| Sample 8 | 60 | 50 | 0.5 |
| Sample 9 | 60 | 40 | 0.5 |
| Sample 10 | 50 | 60 | 0.5 |
| Sample 11 | 50 | 50 | 0.2 |
| Sample 12 | 50 | 40 | 0.5 |

TABLE 2-continued

| | Amplitude (μm) of ultrasonic vibration generated by upstream side ultrasonic generator 4a | Amplitude (μm) of ultrasonic vibration generated by downstream side ultrasonic generator 4b | Deformation amount Δr (mm) |
|---|---|---|---|
| Sample 13 | 40 | 60 | 1 |
| Sample 14 | 40 | 50 | 1 |
| Sample 15 | 40 | 40 | 1 |

As can be understood from the detection results shown in Table 2, it is possible for the upstream side ultrasonic generator 4a generating ultrasonic vibration having an amplitude of not less than 50 μm to reduce the deformation amount Δr of the honeycomb mold body 10 as each of the samples 7 to 12. That is, in order to reduce the deformation amount Δr of the honeycomb mold body 10 as each of the samples 7 to 12, it is preferable for the upstream side ultrasonic generator 4a to generate ultrasonic vibration having an amplitude of not less than 50 μm in the cutting device having the upstream side ultrasonic generator 4a and the downstream side ultrasonic generator 4b arranged at both sides in the direction Y of the honeycomb mold body 10.

Further, it can be understood from the detection results shown in Table 2, it is possible to further reduce the deformation amount Δr of each of the samples 7 and 11 than that of the other samples because the upstream side ultrasonic generator 4a and the downstream side ultrasonic generator 4b supplied, to the samples 7 and 11, ultrasonic vibration having the same amplitude.

It can be understood from a comparison result between the sample 9 and the sample 13, and a comparison result between the sample 12 and the sample 14, it is possible to easily reduce the deformation amount Δr when the amplitude of ultrasonic vibration generated by the vibrator terminal 41 of the upstream side ultrasonic generator 4a becomes greater than the amplitude of ultrasonic vibration generated by the vibrator terminal 41 of the downstream side ultrasonic generator 4b.

That is, it is preferable for the vibrator terminal 41 of the upstream side ultrasonic generator 4a to generate ultrasonic vibration having an amplitude which is smaller than an amplitude of ultrasonic vibration generated by the vibrator terminal 41 of the downstream side ultrasonic generator 4b in view of effective reduction of the deformation amount Δr when the upstream side ultrasonic generator 4a and the downstream side ultrasonic generator 4b in the cutting device 1 are arranged at opposite sides of the honeycomb mold body 10 in the direction Y.

Second Exemplary Embodiment

A description will be given of the cutting device 1 according to a second exemplary embodiment with reference to FIG. 10, FIG. 11 and FIG. 12.

Figure 10:
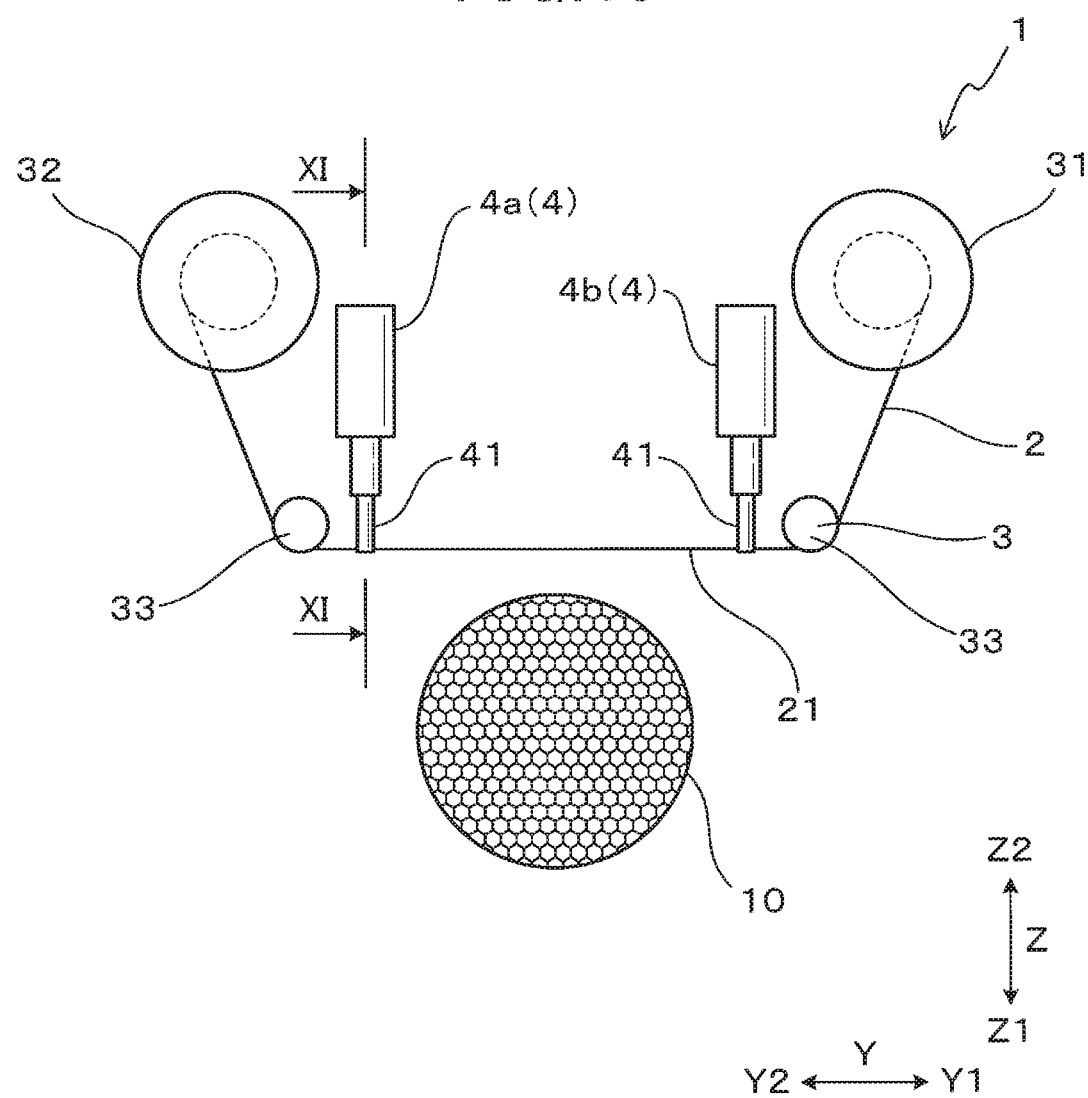
FIG. 10 is a view showing a schematic front image of the cutting device, in which the honeycomb mold body is placed, according to a second exemplary embodiment of the present disclosure.

FIG. 10 is a view showing a schematic front image of the cutting device, in which the honeycomb mold body 10 is placed, according to the second exemplary embodiment of the present disclosure. FIG. 11 is a view showing a schematic cross section along the line Xi-Xi shown in FIG. 11.

In the cutting device 1 according to the second exemplary embodiment, a front end part of each of the vibrator terminals 41 of the upstream side ultrasonic generator 4a and the downstream side ultrasonic generator 4b is different in shape from those in the cutting device according to the first exemplary embodiment.

Figure 11:
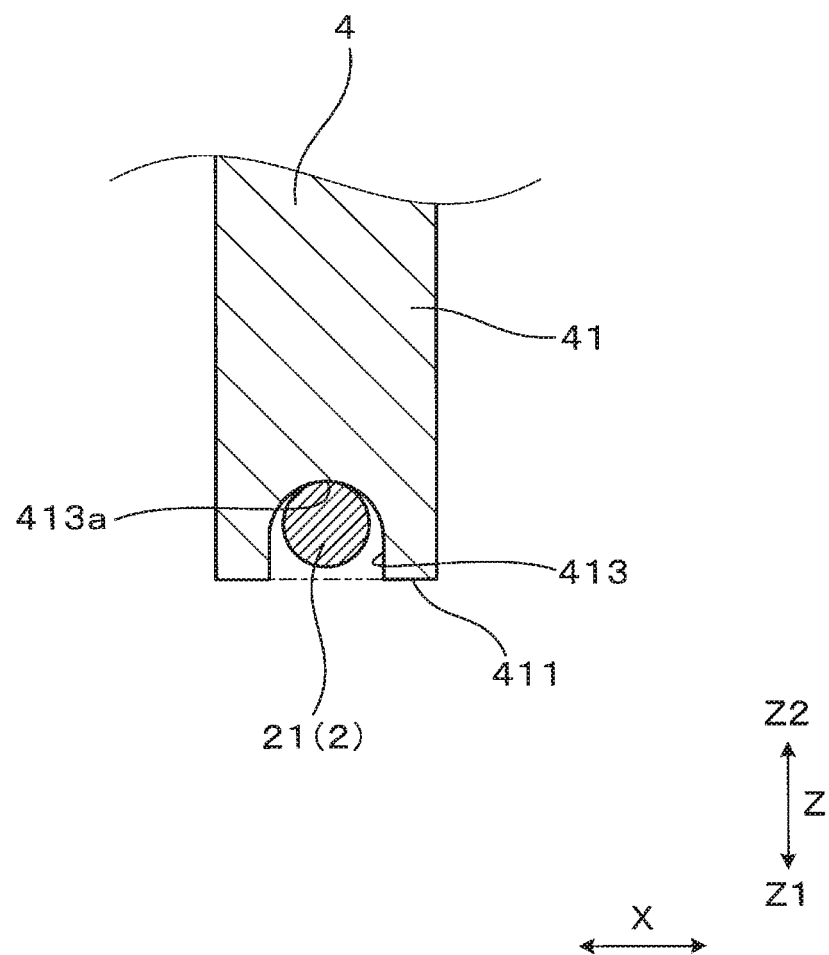
FIG. 11 is a view showing a schematic cross section along the line XI-XI shown in FIG. 11.

Each of the vibrator terminals 41 of the ultrasonic generators 4 (4a, 4b) shown in FIG. 11 has a guide groove 413. The guide groove 413 is formed at a front end surface 411 of the vibrator terminal 41 of the ultrasonic generator 4 (4a, 4b) parallel with the contact part 21 of the wire 2. The contact part 21 of the wire 2 is arranged in the inside of the guide groove 413. The guide groove 413 of each of the vibrator terminals 41 is formed so that a part of the front end surface 411 of the vibrator terminal 41 is recessed toward Z2 side in the cutting direction Z. Both sides in the direction Y in each of the guide grooves 413 are open.

A bottom surface 413a of the guide groove 413 has a curved shape to be fitted with the outer circumferential surface of the wire 2. In more detail, the bottom surface 413a of the guide groove 413 is formed to have a curvature which is smaller than a curvature of the outer circumferential surface of the wire 2.

FIG. 12 is a view showing a schematic cross section of one of ultrasonic generators 4 in the cutting device 1, in which the honeycomb mold body 10 is placed, according to the second exemplary embodiment.

In the cutting device 1 shown in FIG. 11 and FIG. 12, the wire 2 is in contact with, i.e. is fitted with the bottom surface 413a of the guide groove 413 formed at the front end surface 411 of the vibrator terminal 41. That is, the bottom surface 413a of the guide groove 413 forms the contact surface 412 of the vibrator terminal 41 of each of the ultrasonic generators 4 (4a, 4b), in which the contact surface 412 is arranged to be in contact with the contact part 21 of the wire 2.

As shown in FIG. 11, the guide groove 413 has a diameter which is greater than the diameter of the contact part 21 of the wire 2.

The contact part 21 of the wire 2 is arranged to be accommodated in the inside area of the guide groove 413 formed in the vibrator terminal 41. That is, the guide groove 413 is formed to have a dimension in the cutting direction Z which is greater than the diameter of the contact part 21 of the wire 2. The contact part 21 of the wire 2 does not project toward Z1 side rather than the location in Z1 side of the guide groove 413 designated by the two-dot chain line shown in FIG. 11.

As shown in FIG. 12, each of the vibrator terminals 41 has a right-hand corner part 414 and a right-hand side surface part 416. The right-hand side surface part 416 of the vibrator terminal 41 is arranged at the location of the honeycomb structure body 10 in the direction Y. The right-hand corner part 414 is formed in the direction Y between the contact surface 412 and the right-hand side surface part 416. The right-hand corner part 414 has a rounded shape or a curved shape through which the contact surface 412 is smoothly connected to the right-hand side surface part 416. That is, the right-hand side end part of the contact surface 412 arranged at the honeycomb structure body 10 side in the direction Y has the rounded shape toward Z2 side in the cutting direction Z.

In the structure of the cutting device 1 according to the second exemplary embodiment shown in FIG. 12, the vibrator terminal 41 further has a left-hand corner part 415 and a left-hand side surface part 417. The left-hand side surface part 417 of the vibrator terminal 41 is arranged at the location of the guide parts 33 arranged at the left-hand side in the direction Y. The left-hand corner part 415 is formed in the direction Y between the contact surface 412 and the left-hand side surface part 417. The left-hand corner part 415 has a shape smoothly connected to the contact surface 412. That is, the left-hand side end part of the contact surface 412 arranged at the left-hand side guide part 33 in the direction Y has a rounded shape toward Z2 side in the cutting direction Z.

Other components of the cutting device 1 according to the second embodiment are the same as those of the cutting device according to the first exemplary embodiment.

In the structure of the cutting device 1 according to the second embodiment, the front end surface 411 of the vibrator terminal 41 has the guide groove 413 arranged parallel with the contact part 21 of the wire 2. The contact part 21 of the wire 2 is arranged in the inside of the guide groove 413. This structure makes it possible to prevent the wire 2 from being removed from the vibrator terminal 41. This structure makes it possible to easily transmit ultrasonic vibration generated by the vibrator terminal 41 to the wire 2 with high efficiency.

Further, the guide groove 413 has the depth measured in the cutting direction Z which is greater than the diameter of the contact part 21 of the wire 2. This makes it possible to correctly arrange the contact part 21 of the wire 2 into the inside of the guide groove 413. This structure makes it possible to prevent the wire 2 from escaping from the guide groove 413 of the vibrator terminal 41 of each of the ultrasonic generators 4.

In the structure of the cutting device 1 according to the second embodiment, each vibrator terminal 41 has the right-hand corner part 414 and the right-hand side surface part 416. The right-hand side surface part 416 of the vibrator terminal 41 is arranged at the location of the honeycomb structure body 10. The right-hand corner part 414 is formed in the direction Y between the contact surface 412 and the right-hand side surface part 416. The right-hand corner part 414 has a rounded shape or a curved shape through which the contact surface 412 is smoothly connected to the side surface part 416. That is, the end part of the contact surface 412 arranged at the honeycomb structure body 10 side in the direction Y has the rounded shape toward Z2 side in the cutting direction Z. This structure makes it possible to prevent the wire 2 from being worn by the right-hand corner part 414 in a repetition of vibration of the wire 2.

The contact part 21 of the wire 2 is stretched slightly toward Z2 side in the cutting direction Z when the contact part 21 of the wire 2 in the cutting device 1 cuts the honeycomb structure body 10. This easily presses the contact part 21 of the wire 2 at the right-hand side of the vibrator terminal 41 toward the right-hand corner part 414 side (see FIG. 12). It is accordingly possible to maintain the durability of the wire 2 by the rounded shape of the right-hand corner part 414.

In the structure of the cutting device according to the second exemplary embodiment, the left-hand corner part 415 at the front corner part of the vibrator terminal 41 in the cutting direction Z has a shape smoothly connected to the contact surface 412. That is, in addition to the right-hand corner part 414, the left-hand corner part 415 arranged at the left-hand side guide part 33 in the direction Y has a rounded shape toward Z2 side in the cutting direction Z.

That is, each of the vibrator terminals 41 has the improved structure in which both end parts of the contact surface 412 in the direction Y and the pair of the corner parts 414 and 415 formed at the side surface part of each of the right-hand side surface part 416 and the left-hand side surface part 417 have a curved shape. This structure makes it possible to easily improve the productivity of cutting honeycomb mold bodies.

When one of the right-hand outside corner part 414 and the left-hand outside corner part 415 in the vibrator terminal 41 has a curved shape, it is necessary to arrange the ultrasonic generators 4 in the cutting device 1 so that the outside corner part having the curved shape is arranged at a location close to the location of the honeycomb structure body 10.

On the other hand, in the improved structure of the cutting device according to the second exemplary embodiment, it is possible to easily arrange the ultrasonic generators 4 in the cutting device so that the pair of the right-hand outside corner part 414 and the left-hand outside corner part 415 are arranged to align them in the direction Y. This makes it possible to provide the durability of the wire 2 and to increase the productivity of the cutting device 1. It is further possible to prevent the wire 2 from being wearing by the left-hand outside corner part 415. Other behavior and effects of the cutting device according to the second exemplary embodiment are the same as those of the cutting device according to the first exemplary embodiment.

While specific embodiments of the present disclosure have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present disclosure which is to be given the full breadth of the following claims and all equivalents thereof.

What is claimed is:

1. A cutting device which cuts a soft honeycomb mold body along a cutting direction, the honeycomb mold body having an axial direction, the cutting device comprising:
    a wire having an extending direction, the wire comprising a first section of wire which extends in the extending direction of the wire and is in contact with the honeycomb mold body when the honeycomb mold body is cut;
    a tension supply part which supplies tension to the first section of wire when the first section of wire is in contact with the honeycomb mold body and when the honeycomb mold body is cut, the tension supply part having a pair of guide parts and the first section of wire extending between the pair of guide parts, a fixing part which fixes one end of the wire and a winding part which winds the other end of the wire to supply tensile to the wire; and
    ultrasonic generators, each comprising a vibrator terminal which is arranged in contact with the first section of the wire, and configured to generate ultrasonic vibration in the cutting direction and supply the generated ultrasonic vibration to the wire; wherein:
    a cutting direction is substantially perpendicular to the extending direction of the first section of wire extending between the pair of guide parts before the wire performs the cutting of the honeycomb mold body;
    the pair of guide parts of the extension supply part is arranged movably in the cutting direction from the fixing part and the winding part, and the wire is arranged at an outer circumferential part of each of the pair of guide parts; and
    the tension supply is configured to move the pair of guide parts towards a first side of the direction, from the fixing part and the winding part, such that the tension part moves the first section of the wire towards a first direction of the extending direction of the wire.

2. The cutting device according to claim 1, wherein
the tension supply part moves the first section of the wire towards a first direction of the extending direction of the wire, and
the ultrasonic generators comprise:
an upstream side ultrasonic generator equipped with the vibrator terminal arranged at a location in a second direction of the extending direction of the wire; and
a downstream side ultrasonic generator equipped with the vibrator terminal arranged at a location in a first direction of the extending direction of the wire,
wherein the vibrator terminal of the upstream side ultrasonic generator generates ultrasonic vibration having an amplitude of not less than 50 μm.

3. The cutting device according to claim 1, wherein
the ultrasonic generators are arranged on each side of the honeycomb mold body in the extending direction of the wire.

4. The cutting device according to claim 1, wherein
the tension supply part moves the first section of the wire towards a first direction of the extending direction of the wire, and
the ultrasonic generators comprise:
an upstream side ultrasonic generator equipped with the vibrator terminal arranged at a location in a second direction of the extending direction of the wire; and
a downstream side ultrasonic generator equipped with the vibrator terminal arranged at a location in a first direction of the extending direction of the wire, wherein
the vibrator terminal located at the upstream side ultrasonic generator generates ultrasonic vibration having an amplitude which is greater than an amplitude of ultrasonic vibration generated by the vibrator terminal located at the downstream side ultrasonic generator.

5. The cutting device according to claim 1, wherein
each vibrator terminal comprises a guide groove arranged parallel with the first section of the wire, and the first section of the wire is accommodated in the inside of the guide groove formed in the vibrator terminal of each of the ultrasonic generators.

6. The cutting device according to claim 5, wherein the guide groove is formed at a front end surface of the vibrator terminal and is parallel with the first section of the wire.

7. The cutting device according to claim 5, wherein the guide groove bottom surface having a curved shape being fitted with an outer circumference of the wire.

8. The cutting device according to claim 5, wherein
the guide groove has a depth which is larger than a diameter of the first section of the wire, and the first section of the wire is accommodated inside an interior of the guide groove formed in the vibrator terminal of each of the ultrasonic generators.

9. A cutting device system which cuts a soft honeycomb mold body along a cutting direction, the cutting device system comprising:
a honeycomb mold body that has an axial direction;
a wire having an extending direction, the wire comprising a first section of the wire which extends in the extending direction of the wire and is in contact with the honeycomb mold body when the honeycomb mold body is cut;
a tension supply part which supplies tension to the first section of the wire when the first section is in contact with the honeycomb body and when the honeycomb mold body is cut;
the tension supply part having a pair of guide parts, the first section of the wire extending between the guide parts, a fixing part which fixes one end of the wire, and a winding part which winds the other end of the wire to supply tensile to the wire;
ultrasonic generators, each comprising a vibrator terminal which is arranged in contact with the first section of the wire, and configured to generate ultrasonic vibration in the cutting direction, and supply the generated ultrasonic vibration to the wire, wherein,
the cutting direction is a direction along a cross section of the honeycomb mold body,
the cross section is substantially perpendicular to; an axial direction of the honeycomb mold body, and the extending direction of the first section of the wire extending between the pair of guide parts before the wire performs the cutting of the honeycomb mold body, and
the pair of guide parts of the extension supply part is arranged movably in the cutting direction from the fixing part and the winding part, and the wire is arranged at an outer circumferential part of each of the pair of guide parts, and
the tension supply is configured to move the pair of guide parts towards a first side of the direction, from the fixing part and the winding part, such that the tension part moves the first section of the wire towards a first direction of the extending direction of the wire.

10. The cutting device system according to claim 9, wherein
each vibrator terminal comprises a guide groove arranged parallel with the first section of the wire, and the first section of the wire is accommodated in the inside of the guide groove formed in the vibrator terminal of each of the ultrasonic generators.

11. The cutting device system according to claim 10, wherein
the guide groove has a depth which is larger than a diameter of the first section of the wire, and the first section of the wire is accommodated inside an interior of the guide groove formed in the vibrator terminal of each of the ultrasonic generators.

12. The cutting device system according to claim 10, wherein
the tension supply part moves the first section of the wire in, a first direction of the extending direction of the wire; and
the ultrasonic generators comprise:
an upstream side ultrasonic generator equipped with the vibrator terminal arranged at a location in a second direction of the extending direction of the wire; and
a downstream side ultrasonic generator equipped with the vibrator terminal arranged at a location in a first direction of the extending direction of the wire, wherein
a distance between the honeycomb mold body and the vibrator terminal located at the downstream side ultrasonic generator in the extending direction of the wire is greater than a distance between the honeycomb mold body and the vibrator terminal located at the upstream side ultrasonic generator when the wire is cutting the honeycomb mold body.

13. The cutting device system according to claim 9, wherein
the ultrasonic generators are arranged on each side of the honeycomb mold body in the extending direction of the wire.

14. The cutting device system according to claim 9, wherein
the tension supply part moves the first section of the wire towards a first direction of the extending direction of the wire, and
the ultrasonic generators comprise:
an upstream side ultrasonic generator equipped with the vibrator terminal arranged at a location in a second direction of the extending direction of the wire; and
a downstream side ultrasonic generator equipped with the vibrator terminal arranged at a location in a first direction of the extending direction of the wire,
wherein the vibrator terminal located at the upstream side ultrasonic generator generates ultrasonic vibration having an amplitude of not less than 50 μm.

15. The cutting device system according to claim 9, wherein
each of the vibrator terminals further comprise:
a contact surface which is in contact with the first section of the wire;
a side surface part which is positioned close to a location of the honeycomb mold body in the extending direction of the wire; and
a corner part formed between the contact surface and the side surface part, the corner part having a curved shape through which the contact surface is smoothly connected to the side surface part.

16. The cutting device system according to claim 9, wherein
the tension supply part moves the first section of the wire towards a first direction of the extending direction of the wire, and
the ultrasonic generators comprise:
an upstream side ultrasonic generator equipped with the vibrator terminal arranged at a location in a second direction of the extending direction of the wire;
wherein
a downstream side ultrasonic generator equipped with the vibrator terminal arranged at a location in the first direction of the extending direction of the wire, and
wherein
the vibrator terminal located at the upstream side ultrasonic generator generates ultrasonic vibration having an amplitude which is greater than an amplitude of ultrasonic vibration generated by the vibrator terminal located at the downstream side ultrasonic generator.

17. The cutting device system according to claim 9, wherein the cutting device system has a latitudinal direction which is substantially parallel with the extending direction of the wire before the wire performs the cutting of the honeycomb mold body and perpendicular to the axial direction of the honeycomb mold body, and the cutting direction is substantially perpendicular to the latitudinal direction.

18. The cutting device system according to claim 9, wherein
the tension supply part moves the first section of the wire in a first direction of the extending direction of the wire; and
the ultrasonic generators comprise:
an upstream side ultrasonic generator equipped with the vibrator terminal arranged at a location in a second direction of the extending direction of the wire; and
a downstream side ultrasonic generator equipped with the vibrator terminal arranged at a location in a first direction of the extending direction of the wire,
wherein
a distance between the honeycomb mold body and the vibrator terminal located at the downstream side ultrasonic generator in the extending direction of the wire is greater than a distance between the honeycomb mold body and the vibrator terminal located at the upstream side ultrasonic generator when the wire is cutting the honeycomb mold body.

\* \* \* \* \*